United States Patent
Shen et al.

(10) Patent No.: US 12,014,557 B2
(45) Date of Patent: Jun. 18, 2024

(54) HIGH-SPEED AUTOMATIC SCANNING SYSTEM FOR INTERPRETING IMAGES WITH AI ASSISTANCE AND METHOD USING THE SAME

(71) Applicant: V5med Inc., Zhubei (TW)

(72) Inventors: Tzu-Kuei Shen, Hsinchu (TW); Kuo-Tung Hung, Hsinchu (TW); Chien Ting Yang, Hsinchu (TW); Yu Hsun Kao, Hsinchu (TW); Guang-Hao Suen, Hsinchu (TW); Linda Siana, Hsinchu (TW)

(73) Assignee: V5med Inc., Zhubei (TW)

( * ) Notice: Subject to any disclaimer, the term of this patent is extended or adjusted under 35 U.S.C. 154(b) by 402 days.

(21) Appl. No.: 17/645,550

(22) Filed: Dec. 22, 2021

(65) Prior Publication Data
US 2023/0177852 A1 Jun. 8, 2023

(30) Foreign Application Priority Data
Dec. 2, 2021 (TW) .................................. 110144927

(51) Int. Cl.
G06T 7/33 (2017.01)
G06V 10/24 (2022.01)
G06V 20/69 (2022.01)

(52) U.S. Cl.
CPC ............. G06V 20/693 (2022.01); G06T 7/33 (2017.01); G06V 10/24 (2022.01); G06T 2207/10061 (2013.01)

(58) Field of Classification Search
CPC ......... G06V 20/693; G06V 10/24; G06T 7/33
See application file for complete search history.

(56) References Cited

U.S. PATENT DOCUMENTS 4,617,682 A 10/1986 Mori et al.
6,417,936 B1 7/2002 Leberl et al.
(Continued)

FOREIGN PATENT DOCUMENTS

CN 101685000 B 5/2012
CN 205384727 U 7/2016
(Continued)

OTHER PUBLICATIONS

International Search Report Issued by Foreign Patent Office in Application No. 11120368460/110144927.
(Continued)

*Primary Examiner* — Sam Bhattacharya
(74) *Attorney, Agent, or Firm* — Rosenberg, Klein & Lee

(57) ABSTRACT

A high-speed automatic scanning system for interpreting images with AI assistance and method using the same are provided. The system includes a control computer and an image capture platform. Scanning parameters of the image capture platform, including a helically-clockwise or helically-counterclockwise scanning path, is set by the control computer. After the scanning path is selected, the image capture platform aligns a camera to focus on a central block and respectively captures images of the central block's sub-blocks. Until all the blocks have been scanned, the image capture platform repeats the following procedure: moving the focusing position to a next neighboring block according to the scanning path, focusing on the next neighboring block, and capturing images of the sub-blocks of the next neighboring block. The present invention can fast perform scanning, exempted from performing focusing for every image, reducing the cycles and time of focusing.

12 Claims, 4 Drawing Sheets

(56) References Cited

U.S. PATENT DOCUMENTS

| | | |
|---|---|---|
| 7,596,249 B2 | 9/2009 | Bacus et al. |
| 7,747,080 B2 | 6/2010 | Chang et al. |
| 10,630,985 B2 | 4/2020 | Johar et al. |
| 2010/0002771 A1 | 1/2010 | Huang et al. |
| 2020/0250396 A1 | 8/2020 | Horning et al. |

FOREIGN PATENT DOCUMENTS

| | | |
|---|---|---|
| CN | 107147854 A | 9/2017 |
| CN | 104869304 B | 2/2020 |
| JP | S60-3073 A | 1/1985 |
| JP | S63-188286 A | 8/1988 |
| JP | 4550426 B2 | 9/2010 |
| TW | I398157 B | 6/2013 |
| TW | I450572 B | 8/2014 |
| TW | 202022430 A | 6/2020 |

OTHER PUBLICATIONS

Office Action with appended Search Report, which was issued to Japanese counterpart application No. 2021-211906 issued on Nov. 24, 2022.

HIGH-SPEED AUTOMATIC SCANNING SYSTEM FOR INTERPRETING IMAGES WITH AI ASSISTANCE AND METHOD USING THE SAME

This application claims priority of Application No. 110144927 filed in Taiwan on 2 Dec. 2021 under 35 U.S.C. § 119; the entire contents of all of which are hereby incorporated by reference.

BACKGROUND OF THE INVENTION

Field of the Invention

The present invention relates to an image processing technology, particularly to a high-speed automatic scanning system for interpreting images with AI assistance and method using the same.

Description of the Prior Art

In cellular test, cells are placed in a test liquid, and the cell-containing test liquid is prepared to be a biopsy specimen; the biopsy specimen is placed under a microscope and magnified at a high power; the magnified images are displayed on a computer and photographed for inspection.

900-1600 pieces of pictures will be taken from each biopsy specimen. In other words, the biopsy specimen is divided into 900-1600 blocks, and one picture is taken from each block. If the blocks are scanned using only a single group of focal lengths, most of the pictures may be unavailable. If focusing is undertaken once in each shooting, the operations of focusing will amount to 900-1600 cycles, which indeed consume too much manpower. Suppose that the focal length is not adjusted before given pieces of pictures are taken and that refocusing is undertaken after the given pieces of pictures have been taken. In such a case, invalid pictures may be decreased. However, the thickness may vary significantly while the camera is moved to the boundary blocks and then returned to the central blocks. Thus, the camera may be unable to accommodate the abrupt change of the focal length and may fail to refocus and capture useful pictures.

Accordingly, the present invention proposes a high-speed automatic scanning system for interpreting images with AI assistance and method using the same, which not only can decrease the cycles of focusing but also can acquire effective pictures, whereby to overcome the abovementioned problems and meet the future requirement. The principle and embodiments of the present invention will be described in detail below.

SUMMARY OF THE INVENTION

The primary objective of the present invention is to provide a high-speed automatic scanning system for interpreting images with AI assistance and method using the same, which perform scanning helically and successively from the central position of a slide glass to a neighboring block clockwise or counterclockwise, whereby each cycle of focusing needs only minute adjustment.

Another objective of the present invention is to provide a high-speed automatic scanning system for interpreting images with AI assistance and method using the same, which divide each bock of a slide glass into a plurality of sub-blocks and then capture images of the sub-blocks, whereby only the block need be focused and the sub-blocks thereof needn't be focused one by one, wherefore the present invention can significantly decrease the cycles of focusing.

In order to achieve the abovementioned objectives, the present invention provides a high-speed automatic scanning method for interpreting images with AI assistance, which comprises steps: setting scanning parameters of an image capture platform, wherein the scanning parameters include a numeral value by which a slide glass is divided into a plurality of blocks, a numeral value by which one block is divided into a plurality of sub-blocks, a position of a central block, and a scanning path, wherein the scanning path may be a scanning path going helically clockwise or a scanning path going helically counterclockwise; selecting the scanning path, aligning a focusing position of the image capture platform to the central block on the slide glass for focusing, and respectively capturing images of the sub-blocks of the central block; moving the focusing position of the image capture platform from the central block to a neighboring block according to the scanning path, wherein the neighboring block is adjacent to the central block, focusing on the neighboring block, and capturing images of the sub-blocks of the neighboring block; and repeating a procedure until all the blocks have been scanned, wherein the procedure includes moving the focusing position to a next neighboring block according to the scanning path, focusing on the next neighboring block, and capturing images of the sub-blocks of the next neighboring block.

In one embodiment, the block at a center of the blocks is set as the central block according to the scanning parameters, and the central block is a start point of the scanning path.

In one embodiment, the scanning parameters include a terminal point of the scanning path such that all the blocks have been scanned once along the scanning path.

In one embodiment, if the scanning path is along a helically clockwise direction, the focusing position of the image capture platform is helically clockwise moved from the central block to a block neighboring the central block.

In one embodiment, if the scanning path is along a helically counterclockwise direction, the focusing position of the image capture platform is helically counterclockwise moved from the central block to a block neighboring the central block.

In one embodiment, the image capture platform includes a digital camera, a program-controllable mechanical stage, and a focusing mechanism.

In one embodiment, the images of the plurality of sub-blocks are captured along a helical scanning path.

The present invention provides a high-speed automatic scanning system for interpreting images with AI assistance, which comprises a control computer, including a parameter setting module used to set scanning parameters, wherein the scanning parameters include a numeral value by which a slide glass is divided into a plurality of blocks, a numeral value by which one block is divided into a plurality of sub-blocks, a position of a central block, and a scanning path, and wherein the scanning path may be a scanning path going helically clockwise or a scanning path going helically counterclockwise; and an image capture platform, connected with the control computer, aligning a camera of the image capture platform to focus on the central block according to the scanning parameters, respectively capturing images of the sub-blocks of the central block; repeating a procedure until all the blocks have been scanned, wherein the procedure includes moving the focusing position to a next neighboring block according to the scanning path, focusing on the next neighboring block, and capturing images of the sub-blocks of the next neighboring block.

DETAILED DESCRIPTION OF THE INVENTION

The present invention provides a high-speed automatic scanning system for interpreting images with AI assistance and method using the same, which are scanning technologies for capturing images on a slide glass while a microscope is used in cellular inspection. The scanning system and method of the present invention can perform scanning fast, and the focused blocks neighbor each other. Therefore, the focal lengths vary slightly, and the opportunity of focusing error becomes lower.

Figure 1:
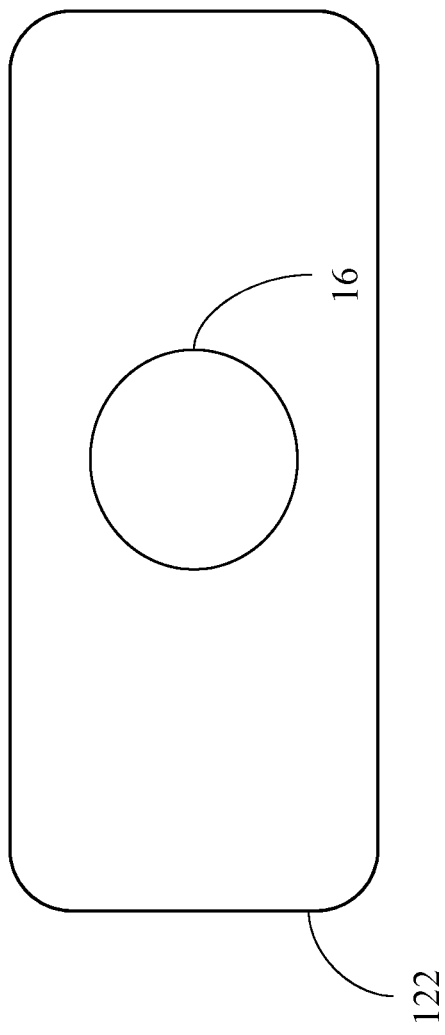
FIG. 1 is a top view of a tested cell-containing liquid on a slide glass.
Figure 2:
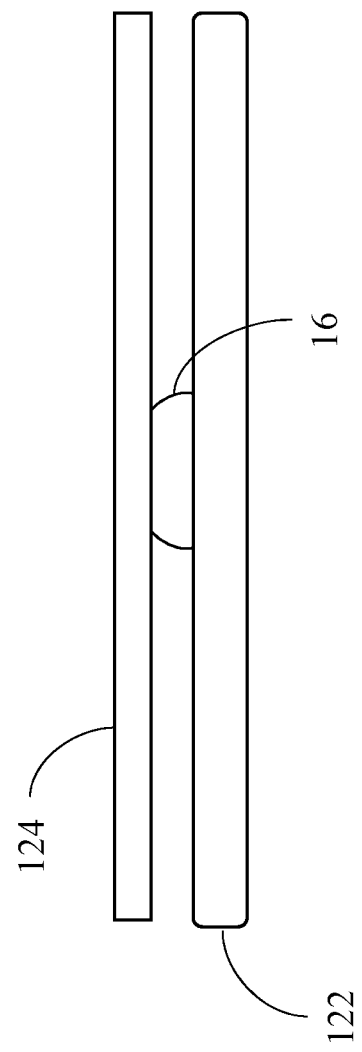
FIG. 2 is a side view of a tested cell-containing liquid on a slide glass.
Figure 3:
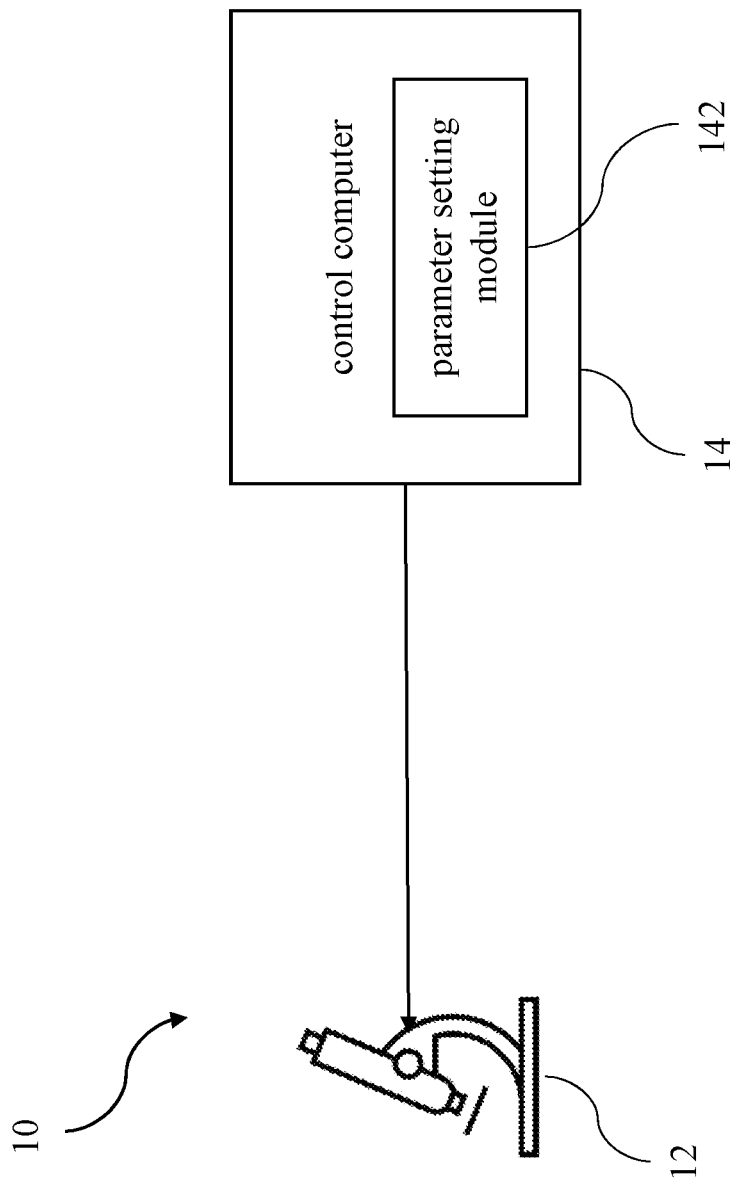
FIG. 3 is a diagram schematically showing the architecture of the high-speed automatic scanning system of the present invention.

FIG. 1 and FIG. 2 are respectively a top view and a side view of a tested cell-containing liquid on a slide glass. While the tested cells are added to a test liquid, the tested cell-containing liquid is sucked and dripped onto a slide glass 122 with a dropper to form a tested cell-containing liquid 16 on the slide glass 122, as shown in FIG. 2. Because of surface tension, the tested cell-containing liquid 16 has a circular shape and has a thickness in the side view, as shown in FIG. 3. The tested cell-containing liquid 16 is covered with a cover glass 124 to form a test glass that is to be placed on an image capture platform. The present invention is also applicable to the test glass free of the cover glass.

Refer to FIG. 3, which shows the architecture of the high-speed automatic scanning system of the present invention. The automatic scanning system 10 comprises an image capture platform 12 and a control computer 14. The image capture platform 12 includes a digital camera, a program-controllable mechanical stage and a focusing mechanism. The image capture platform 12 is in signal communication with the control computer 12. The control computer 14 includes a parameter setting module 142 used to set the scanning parameters. The scanning parameters include a numeral value by which the slide glass is divided into a plurality of blocks, a numeral value by which one block is divided into a plurality of sub-blocks, a position of a central block, and a scanning path. For example, a slide glass is averagely divided into N*N blocks, and one sub-block is averagely divided into n*n sub-blocks, wherein both N and n are positive integers. It should be particularly noted: the scanning path proceeds neither horizontally nor vertically but goes helically clockwise or counterclockwise in the present invention. The scanning path includes a start point and a terminal point. While the scanning operation reaches the terminal point, it means that all the blocks have been scanned once. The control computer 14 controls the movement, focusing, and photographing of the camera of the image capture platform 12 according to the scanning parameters. The images captured by the image capture platform 12 are transmitted to the control computer 14. The control computer 12 may further transmit the captured images to a rear-end database (not shown in the drawings).

Figure 4:
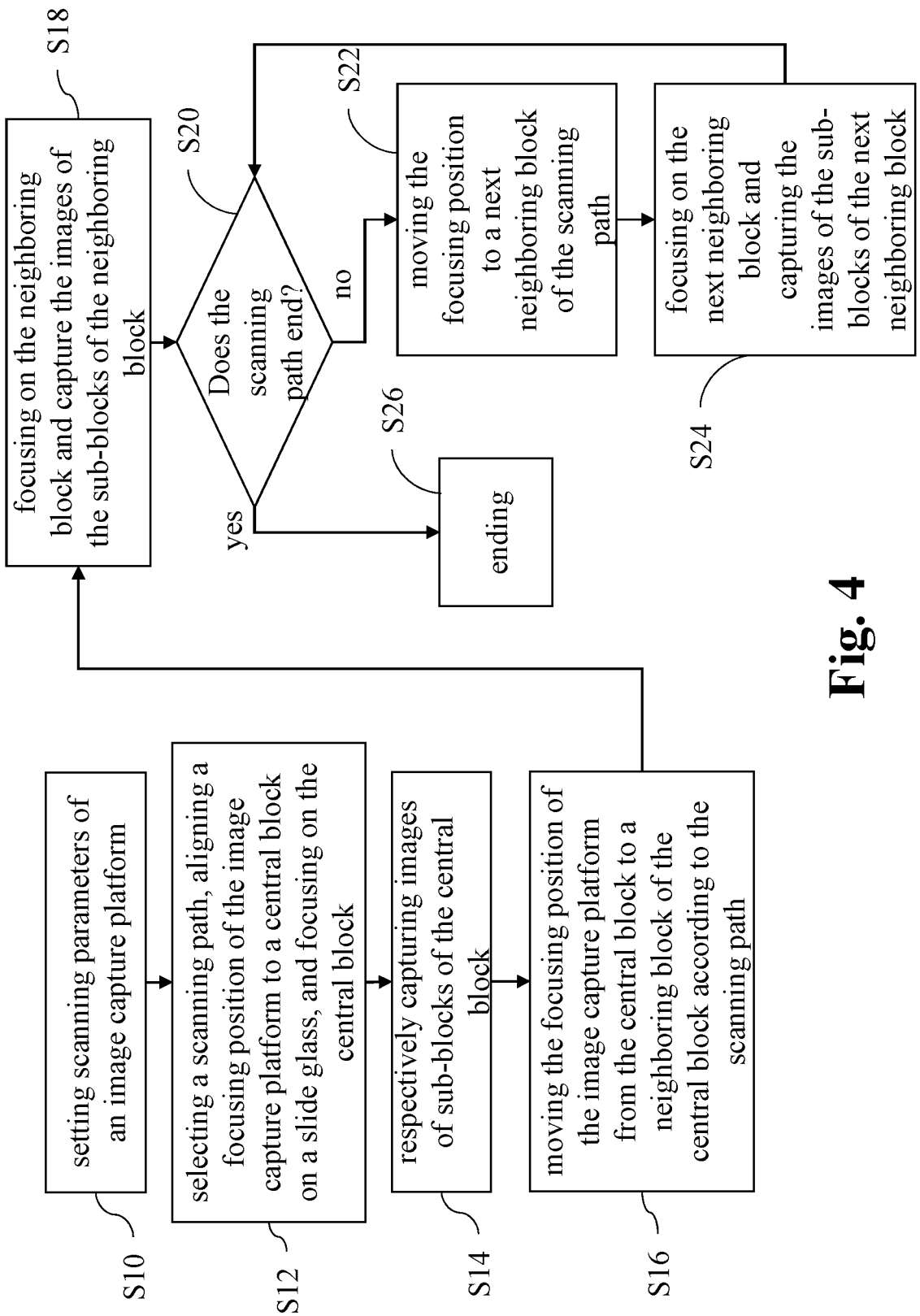
FIG. 4 shows a flowchart of the high-speed automatic scanning method of the present invention.

FIG. 4 shows a flowchart of the high-speed automatic scanning method of the present invention. Refer to FIG. 3 and FIG. 4. In Step S10, the user sets the scanning parameters of the image capture platform 12 on the control computer 14, including a numeral value by which the slide glass is divided into a plurality of blocks, a numeral value by which one block is divided into a plurality of sub-blocks, a position of a central block, and scanning paths, as mentioned above, wherein the scanning paths include a scanning path going helically clockwise or counterclockwise. In Step S12 and Step S14, the user selects a scanning path, and the control computer 14 controls the image capture platform 12 to align a focusing position to the central block on the slide glass and perform focusing according to the scanning parameters and then respectively capture the images of the sub-blocks of the central block. In Step S16, the control computer 14 moves the focusing position from the central block to the block neighboring the central block according to the scanning path. In Step S18, after moving the focusing position to the neighboring block according to the scanning path, the control computer 14 controls the image capture platform 12 to perform focusing on the neighboring block and capture the images of the sub-blocks of the neighboring block. In Step S20, the control computer 14 determines whether the travel of the scanning path is finished. If the travel of the scanning path is finished, it means that the last block has been scanned, and the process proceeds to Step S26 for ending. If the travel of the scanning path is being undertaken, the process proceeds to Step S22 and Step S24. In Step S22 and Step S24, the control computer 14 controls the image capture platform 12 to move the focusing position to the next neighboring block and perform focusing on the next neighboring block, and then capture the images of the sub-blocks of the next neighboring block. Next, the process returns to Step S20 to determine whether the travel of the scanning path is finished. If the travel of the scanning path has not been finished yet, Step S22 and Step S24 are undertaken repeatedly until all the blocks have been scanned. All the images of the sub-blocks are transmitted to the control computer 14. Later, the control computer 14 or another computer interprets the images with the assistance of artificial intelligence (AI).

If the selected scanning path goes clockwise, the focusing position of the image capture platform 12 is moved clockwise from the central block to a block neighboring the central block. If the selected scanning path goes counterclockwise, the focusing position of the image capture platform 12 is moved counterclockwise from the central block to a block neighboring the central block.

Figure 5:
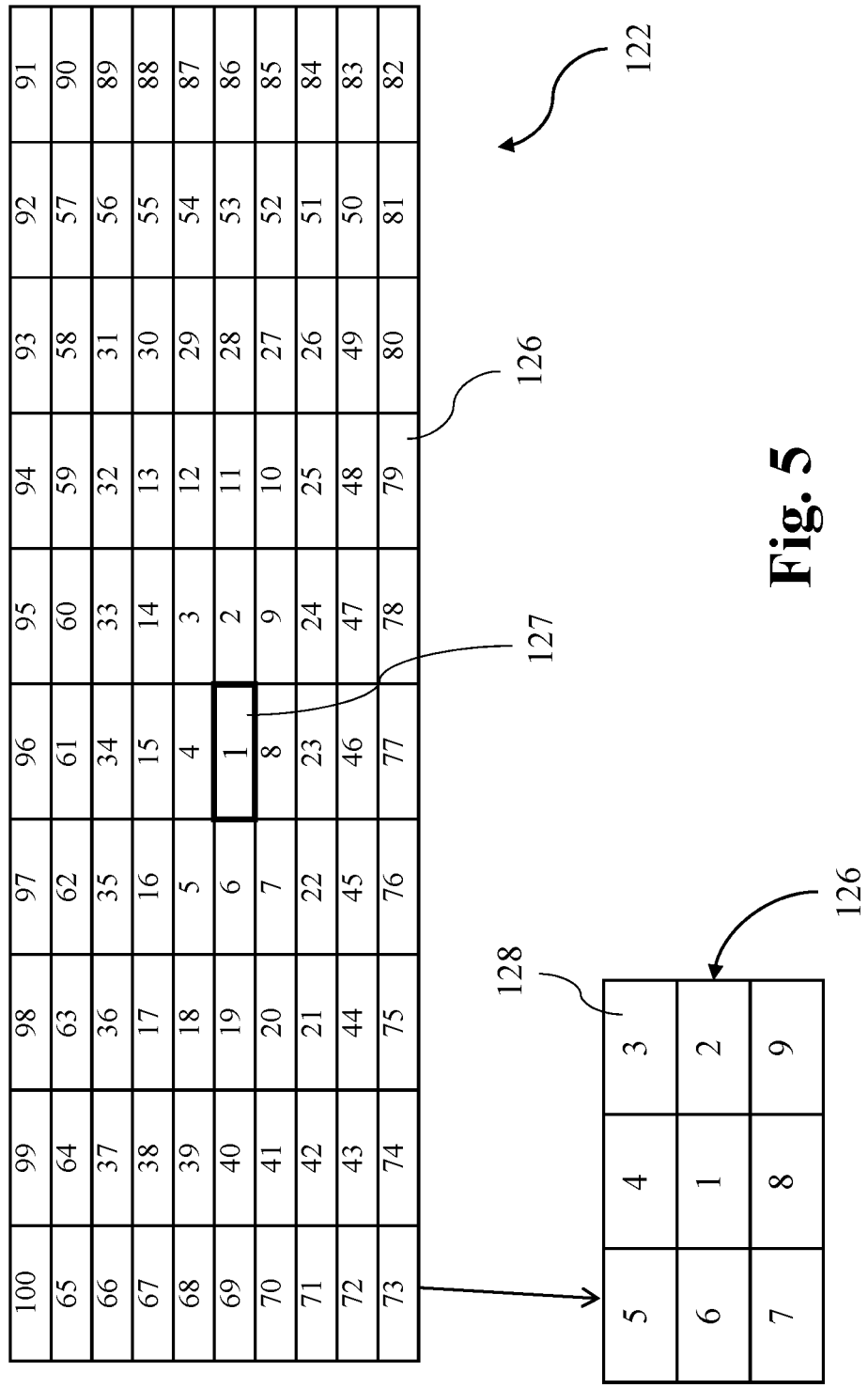
FIG. 5 is a diagram schematically showing a practical example of the high-speed automatic scanning method of the present invention.

FIG. 5 shows a practical example of the high-speed automatic scanning method of the present invention. In FIG. 5, the slide glass 122 is divided into 10*10 blocks 126. Each block 126 further contains 3*3 sub-blocks 128. The image capture platform captures one image from each sub-block. Therefore, 9 images are captured from each block, and 900 images are captured from the slide glass 122. The block at the central position of the slide glass 122 is used as the central block. In the setting of the control computer. In the setting of the control computer, the central block 127 is numbered 1. The image capture platform performs at least one cycle of focusing on sub-blocks 128 of the central block 127 (numbered 1) in advance and then captures 9 images of the sub-blocks 128. The images of the sub-blocks 128 may be captured in a sequence from 1 to 9. For example, the images of the sub-blocks 128 are captured from the sub-block numbered 1 to the sub-block number 9 counterclockwise. However, the present invention is not limited by the sequence. Suppose that the scanning is performed helically counterclockwise in this embodiment. The image capture platform moves the camera to the block numbered 2, performs focusing once again and captures 9 images of the sub-blocks. The assigned numbers of the blocks 126 indicate the scanning path. According to the sequence of the numbers, the camera is moved to the blocks numbered 3, 4, . . . , 99, 100 to perform focusing and capture the images of the sub-blocks. In each movement, the camera is moved counterclockwise to the neighboring block. Because the shapes and thicknesses of the neighboring blocks vary slightly, focusing is less likely to fail. The camera may even need minute adjustment only without using refocusing. In the conventional technology, scanning is performed to-and-fro horizontally or vertically. While the camera is moved to the border and then returned to the center, the camera may fail to accommodate the abrupt change of the focal length. The present invention outperforms the conventional technology in a smaller probability of defocusing.

Besides, each block 126 needs only a single cycle of focusing. Therefore, capturing 900 images only needs 100 cycles of focusing in the present invention. In the conventional technology, capturing 900 images needs 900 cycles of focusing. The more the blocks 126 the slide glass 122 is divided into, the greater the difference between the numbers of the cycles of focusing of the present invention and the conventional technology. Thus, the present invention can significantly decrease the cycles of focusing and increase the efficiency of scanning without degrading the quality of scanning.

The embodiments have been described above to demonstrate the principles of the present invention. However, these embodiments are only to exemplify the present invention but not to limit the scope of the present invention. Any modification or variation according to the spirit or characteristics of the present invention is to be also included by the scope of the present invention.

What is claimed is:

1. An high-speed automatic scanning method, for interpreting images with artificial intelligence-assistance, comprising steps:
   setting scanning parameters of an image capture platform, wherein the scanning parameters include a numeral value by which a slide glass is divided into a plurality of blocks, a numeral value by which one block is divided into a plurality of sub-blocks, a position of a central block, and a scanning path, and the scanning path may be a scanning path going helically clockwise or a scanning path going helically counterclockwise;
   selecting the scanning path, aligning a focusing position of the image capture platform to the central block on the slide glass for focusing, and respectively capturing images of the sub-blocks of the central block;
   moving the focusing position of the image capture platform from the central block to a neighboring block according to the scanning path, wherein the neighboring block is adjacent to the central block, focusing on the neighboring block, and capturing images of the sub-blocks of the neighboring block; and
   repeating a procedure until all the blocks have been scanned, wherein the procedure includes moving the focusing position to a next neighboring block according to the scanning path, focusing on the next neighboring block, and capturing images of the sub-blocks of the next neighboring block.

2. The high-speed automatic scanning method according to claim 1, wherein the block at a center of the blocks is set as the central block according to the scanning parameters, and the central block is a start point of the scanning path.

3. The high-speed automatic scanning method according to claim 1, wherein the scanning parameters include a terminal point of the scanning path such that all the blocks have been scanned once along the scanning path.

4. The high-speed automatic scanning method according to claim 1, wherein if the scanning path is along a helically clockwise direction, the focusing position of the image capture platform is helically clockwise moved from the central block to a block neighboring the central block.

5. The high-speed automatic scanning method according to claim 1, wherein if the scanning path is along a helically counterclockwise direction, the focusing position of the image capture platform is helically counterclockwise moved from the central block to a block neighboring the central block.

6. The high-speed automatic scanning method according to claim 1, wherein the image capture platform includes a digital camera, a program-controllable mechanical stage, and a focusing mechanism.

7. The high-speed automatic scanning method according to claim 1, wherein images of the plurality of sub-blocks are captured along a helical scanning path.

8. A high-speed automatic scanning system, for interpreting images with artificial intelligence-assistance, comprising:
   a control computer, including a parameter setting module used to set scanning parameters, wherein the scanning parameters include a numeral value by which a slide glass is divided into a plurality of blocks, a numeral value by which one block is divided into a plurality of sub-blocks, a position of a central block, and a scanning path, and wherein the scanning path may be a scanning path going helically clockwise or a scanning path going helically counterclockwise; and
   an image capture platform, connected with the control computer, aligning a camera of the image capture platform to focus on the central block according to the scanning parameters, respectively capturing images of the sub-blocks of the central block; repeating a procedure until all the blocks have been scanned, wherein the procedure includes moving the focusing position to a next neighboring block according to the scanning path, focusing on the next neighboring block, and capturing images of the sub-blocks of the next neighboring block.

9. The high-speed automatic scanning system according to claim 8, wherein the parameter setting module sets a central point of the slide glass as the central block, and the central block is a start point of the scanning path.

10. The high-speed automatic scanning system according to claim 8, wherein the parameter setting module sets a terminal point of the scanning path such that all the blocks have been scanned once along the scanning path.

11. The high-speed automatic scanning system according to claim 8, wherein if the scanning path is along a helically clockwise direction, the focusing position of the image capture platform is helically clockwise moved from the central block to a block neighboring the central block.

12. The high-speed automatic scanning system according to claim 8, wherein if the scanning path is along a helically counterclockwise direction, the focusing position of the image capture platform is helically counterclockwise moved from the central block to a block neighboring the central block.

\* \* \* \* \*